United States Patent
Ai

(10) Patent No.: US 10,917,908 B2
(45) Date of Patent: Feb. 9, 2021

(54) DYNAMIC SCHEDULING METHOD AND APPARATUS

(71) Applicant: ZTE CORPORATION, Guangdong (CN)

(72) Inventor: Jianxun Ai, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/272,873

(22) Filed: Feb. 11, 2019

(65) Prior Publication Data

US 2019/0230698 A1 Jul. 25, 2019

Related U.S. Application Data

(63) Continuation of application No. PCT/CN2017/097393, filed on Aug. 14, 2017.

(30) Foreign Application Priority Data

Aug. 12, 2016 (CN) .......................... 2016 1 0670238

(51) Int. Cl.
*H04W 72/12* (2009.01)
*H04W 4/06* (2009.01)

(52) U.S. Cl.
CPC ......... *H04W 72/1289* (2013.01); *H04W 4/06* (2013.01); *H04W 72/12* (2013.01); *Y02D 70/00* (2018.01)

(58) Field of Classification Search
CPC .... H04W 72/1289; H04W 4/06; H04W 72/12
See application file for complete search history.

(56) References Cited

U.S. PATENT DOCUMENTS

| | | | |
|---|---|---|---|
| 2012/0227536 A1 | 11/2012 | Jewett | |
| 2012/0275364 A1 | 11/2012 | Anderson | |
| 2012/0275365 A1 | 11/2012 | Anderson | |
| 2012/0275366 A1 | 11/2012 | Anderson | |
| 2014/0029459 A1 | 1/2014 | Kwon et al. | |
| 2016/0014695 A1* | 1/2016 | Ehsan | H04W 52/0235 |

FOREIGN PATENT DOCUMENTS

| | | |
|---|---|---|
| CN | 101932023 A | 12/2010 |
| CN | 103636264 A | 3/2014 |

OTHER PUBLICATIONS

International Search Report dated Oct. 26, 2017 for International Application No. PCT/CN2017/097393, 5 pages.

(Continued)

*Primary Examiner* — Ronald B Abelson
(74) *Attorney, Agent, or Firm* — Knobbe, Martens, Olson & Bear LLP

(57) ABSTRACT

Provided is a dynamic scheduling method and apparatus. The method includes: in a process in which a user equipment (UE) receives data of a channel A, the UE triggers to start or restart an inactivity timer a preset length at a preset moment; during running of the inactivity timer, the UE receives a Physical Downlink Control Channel (PDCCH) signaling sent by a base station, and detects a PDCCH signaling for scheduling a downlink control information (DCI) of the channel A.

17 Claims, 4 Drawing Sheets

(56) References Cited

OTHER PUBLICATIONS

Written Opinion of the International Searching Authority dated Oct. 26, 2017 for International Application No. PCT/CN2017/097393, 3 pages.
Huawei, "Introduction of NB-Iot", 3GPP TSG-RAN WG2 Meeting #94 R2-164415, 27 May 27, 2016, section 12, 56 pages.
Ericsson, Connected Mode for NB-IOT, 3GPP Draft, R2-161641, 3rd Generation Partnership Project (3GPP), Mobile Competence Centre, vol. RAN WG2, No. Malta, Feb. 14, 2016, France, Retrieved from: URL:http://www.3gpp.org/ftp/meetings_3gpp_sync/ran2/docs/.
Ericsson, Remaining DRX Issues for BLUEs and UEs in EC, 3GPP Draft, R2-161691, 3rd Generation Partnership Project (3GPP), Mobile Competence Centre, vol. RAN WG2, No. St. Julian's Malta, Feb. 14, 2016, France, Retrieved from: URL:http://www.3gpp.org/ftp/meetings_3gpp_sync/ran2/docs/.
DRX Related Timers Handling, 3GPP Draft, R2-156766, 3rd Generation Partnership Project (3GPP), Mobile Competence Centre, vol. RAN WG2, No. Anehaim, USA, Nov. 16, 2015, France, Retrieved from: URL:http://www.3gpp.org/ftp/meetings_3gpp_sync/ran2/docs/.
3rd Generation Partnership Project, Technical Specification Group Radio Access Network, Evolved Universal Terrestrial Radio Access Network (E-UTRA), Medium Access Control (MAC) protocol specification, 3rd Generation Partnership Project (3GPP), Mobile Competence Centre, vol. RAN WG2, No. V13.2.0, Jul. 7, 2016, France, pp. 1-91.
Extended European Search Report for EP Patent Application No. 17838843.5 dated Mar. 3, 2020.

\* cited by examiner

DYNAMIC SCHEDULING METHOD AND APPARATUS

CROSS-REFERENCE TO RELATED APPLICATIONS

This application is a continuation application of International Patent Application No. PCT/CN2017/097393, filed on Aug. 14, 2017, which claims priority to Chinese patent application No. 201610670238.4 filed on Aug. 12, 2016, contents of both of which are incorporated herein by reference in their entireties.

TECHNICAL FIELD

The present disclosure relates to the field of communications and, in particular, to a dynamic scheduling method and apparatus.

BACKGROUND

Single Cell Point to Multipoint transmission (SC-PTM) technology is introduced in 3GPP LTE, and is used for implementing a point to multipoint downlink Multimedia Broadcast Multicast Service (MBMS) in a single cell. The SC-PTM introduces two types of logical channels: Single Cell-Multicast Control Channel (SC-MCCH) and Single Cell-Multicast Traffic Channel (SC-MTCH). In the Long Time Evolution (LTE) system, both the SC-MCCH and the SC-MTCH are carried by a Physical Downlink Shared Channel (PDSCH).

An SC-MTCH channel carries data of one MBMS service. In LTE, the scheduling information of the SC-MTCH includes: a scheduling period and a starting offset, a length of duration interval (OnDurationTimer) that may be scheduled, and a length of time (drxInactivityTimerSCPTM) that the UE waits after successfully receiving downlink data of one SC-MTCH. FIG. 1 is a schematic diagram of scheduling of an SC-MTCH channel in an LTE system in the related art. As shown in FIG. 1, an eNB may schedule a PDSCH channel of an SC-MTCH carrying an MBMS service in any one of the wireless subframes that specified by the SC-MTCH scheduling information. After the UE successfully receives downlink data of the MBMS service, the UE continues to wait for the drxInactivityTimerSCPTM, until the drxInactivityTimerSCPTM expires or receives new data of the MBMS service. During the drxInactivityTimerSCPTM, the UE needs to continuously detect the PDCCH channel, so as to discover the PDCCH signaling sent by the base station for scheduling next SC-MTCH data.

In NB-IoT or eMTC, the scheduling of the SC-MTCH channel in SC-PTM are not satisfactory for the following reasons: (1) in the SC-PTM, in order to enhance the reception of the UE under coverage, the same PDCCH signaling and PDSCH channel data need to be repeatedly transmitted multiple times; therefore the PDCCH signaling for scheduling the PDSCH indicates, in addition to the time-frequency domain resource used for indicating the PDSCH channel and the modulation and coding scheme, the repetition number of the scheduled PDSCH, and the starting time of scheduling the transmission of the PDSCH; (2) Both NB-IoT and eMTC use a narrowband system configuration, resulting in extremely limited resources available in the frequency domain.

Based on this, FIG. 2 is a schematic diagram of dynamic scheduling in NB-IoT or eMTC in the related art. As shown in FIG. 2, in NB-IoT and eMTC, in order to enhance the reception of UE under coverage in NB-IoT and eMTC, the scheduling of PDCCH and PDSCH needs to be repeated for multiple times and staggered in time domain in the dynamic scheduling process; therefore the time required for each dynamic scheduling is longer; furthermore, compared with situation that the PDCCH indication and the corresponding PDSCH scheduling are completed in one subframe in the conventional LTE system, a complete dynamic scheduling in NB-IoT requires tens of subframes for repeatedly transmitting PDCCH and hundreds of subframes for repeatedly transmitting corresponding PDSCH. It can be seen that, in the process of receiving the PDSCH channel by the UE, the UE is in a state of receiving the previously dynamically scheduled data of the SC-MTCH for at least a certain period of time; at this time, in the process of scheduling the next data of the SC-MTCH, the base station has insufficient resources in the cell for scheduling due to the resource limitation of the narrowband of the NB-IoT and the eMTC.

On the other hand, for NB-IoT and eMTC, according to the definition of InactivityTimer in the related art, the UE has to monitor the PDCCH channel ineffectively for a long time in which the next data scheduling of SC-MTCH will not exist, thereby causing great waste of battery power of the UE.

SUMMARY

Embodiments of the present disclosure provide a dynamically scheduling method and apparatus.

According to an embodiment of the present disclosure, a dynamic scheduling method is provided. In the method, in the process that a UE receives data of channel A, the UE triggers to start or restart an inactivity timer with a preset length at a preset moment; during running of the inactivity timer, the UE receives a PDCCH signaling sent by a base station, and detects downlink control information (DCI) for scheduling the channel A in the PDCCH signaling.

According to another aspect of the present disclosure, a dynamic scheduling apparatus applied to a UE is provided. The apparatus includes a startup module, a receiving module and a detecting module. The startup module is configured to trigger to start or restart an inactivity timer with a preset length at a preset moment in a process of receiving data of a channel A. The receiving module is configured to receive a signaling of a PDCCH signaling during running of the inactivity timer. The detecting module is configured to detect DCI for scheduling the channel A in the PDCCH signaling.

According to another aspect of the present disclosure, a dynamic scheduling apparatus applied to a base station is provided. The apparatus includes a scheduling module and a transmitting module. The scheduling module is configured to dynamically schedule a channel A. The transmitting module is configured to transmit a PDCCH signaling to a UE.

According to another embodiment of the present disclosure, a dynamic scheduling method is provided. In the method, a base station dynamically schedules a channel A for a UE; and the base station transmits a Physical Downlink Control Channel (PDCCH) signaling to the UE.

According to the embodiments of the present disclosure, after successfully receiving a dynamically scheduled channel A, the UE only needs to detect the PDCCH within a necessary time range to receive subsequent possible scheduling of channel A, which avoids continuous invalid detection of the PDCCH in a long time range. In view of this, the effect of saving power is achieved.

BRIEF DESCRIPTION OF DRAWINGS

The drawings described herein are used to provide a further understanding of the present disclosure and form a part of the present application. The exemplary embodiments and descriptions thereof in the present disclosure are used to explain the present disclosure and not to limit the present disclosure in any improper way. In the drawings.

DETAILED DESCRIPTION

Hereinafter the present disclosure will be described in detail with reference to the drawings in conjunction with embodiments. It is to be noted that if not in collision, the embodiments and features therein in the present application may be combined with each other.

It is to be noted that the terms "first", "second" and the like in the description, claims and drawings of the present disclosure are used to distinguish between similar objects and are not necessarily used to describe a particular order or sequence.

Embodiment 1

Figure 1:
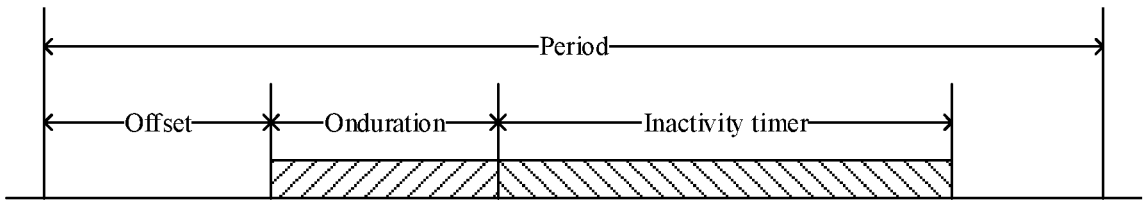
FIG. 1 illustrates a schematic diagram of scheduling of an SC-MTCH channel in an LTE system in the related art.
Figure 2:
FIG. 2 illustrates a schematic diagram of dynamic scheduling in NB-IoT or eMTC in the related art.
Figure 3:
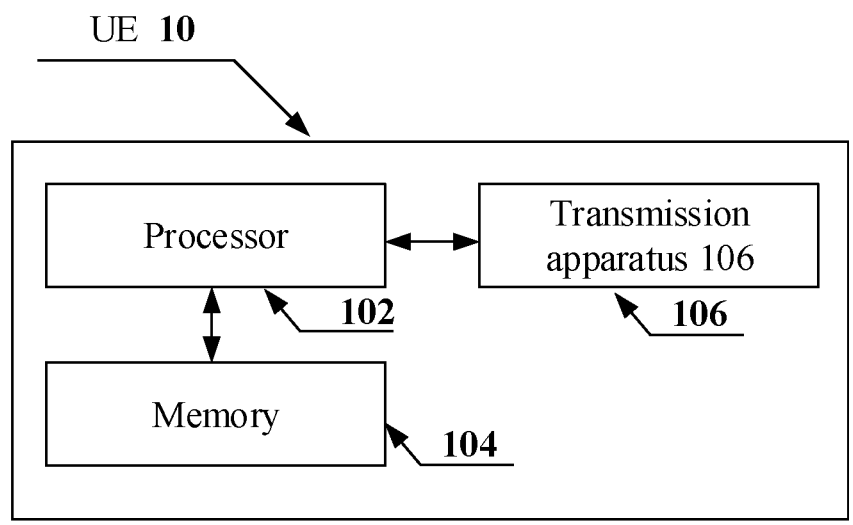
FIG. 3 is a block diagram of a hardware structure of a user equipment of a dynamic scheduling method according to an embodiment of the present disclosure.

Method embodiments provided by the embodiments of the present disclosure may be executed in a user equipment (UE), a computer terminal or other similar computing devices. For example, the method is implemented on the UE. FIG. 3 is a block diagram showing a hardware structure of a user equipment of a dynamic scheduling method according to an embodiment of the present disclosure. As shown in FIG. 3, the UE 10 may include one or more (only one is shown) processors 102 (the processors 102 may include, but are not limited to, a processing device such as a microprocessor MCU or a programmable logic device FPGA), a memory 104 configured to store data, and a transmission apparatus 106 configured to implement a communication function. It should be understood by those skilled in the art that the structure shown in FIG. 3 is merely illustrative and not intended to limit the structure of the electronic device described above. For example, the UE 10 may further include more or less components than the components shown in FIG. 3, or has a configuration different from the configuration shown in FIG. 3.

The memory 104 may be configured to store software programs and modules of application software, such as program instructions/modules corresponding to the dynamic scheduling method in the embodiments of the present disclosure. The processor 102 executes the software programs and modules stored in the memory 104 to perform functional applications and data processing, that is, to implement the method described above. The memory 104 may include a high-speed random access memory, and may further include a nonvolatile memory, such as one or more magnetic storage devices, flash memories or other nonvolatile solid-state memories. In some examples, the memory 104 may further include memories that are remotely disposed with respect to the processors 102. These remote memories may be connected to the UE 10 via a network. Examples of the network described above include, but are not limited to, the Internet, an intranet, a local area network (LAN), a mobile communication network and a combination thereof.

The transmission apparatus 106 is configured to receive or send data via a network. Specific examples of such a network may include a wireless network provided by a communication provider of the UE 10. In one example, the transmission device 106 includes a network interface controller (NIC), which may be connected to other network devices via a base station and thus be capable of communicating with the Internet. In one example, the transmission device 106 may be a radio frequency (RF) module, which is used for communicating with the Internet in a wireless way.

Figure 4:
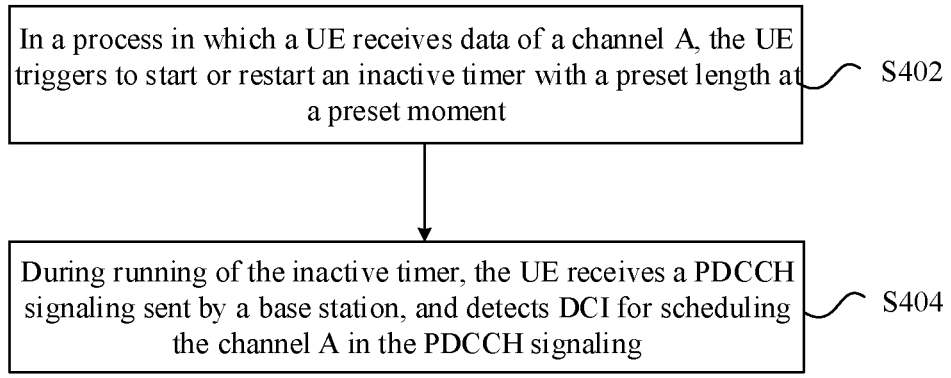
FIG. 4 is a flowchart 1 of a dynamic scheduling method according to an embodiment of the present disclosure.

The present embodiment provides a dynamic scheduling method applied to the UE. FIG. 4 is a flowchart 1 of a dynamic scheduling method according to an embodiment of the present disclosure. As shown in FIG. 4, the method includes steps S402 and S404 described below.

In step S402, in a process in which a UE receives data of a channel A, the UE triggers to start or restart an inactivity timer with a preset length at a preset moment.

In step S404, during running of the inactivity timer, the UE receives a PDCCH signaling sent by a base station, and detects DCI for scheduling the channel A in the PDCCH signaling.

According to the above steps S302 and S304 of this embodiment, after successfully receiving a dynamically scheduled channel A, the UE only needs to detect the PDCCH within a necessary time range to receive subsequent possible scheduling of channel A, which avoids continuous invalid detection of the PDCCH in a long time range. In view of this, the effect of saving power is achieved.

In an optional implementation mode of this embodiment, the preset length involved in the embodiment is indicated by the base station to the UE through a System Information Block (SIB), a dedicated signaling, or a Single Cell Multicast Control Channel (SC-MCCH) message; or the preset length is agreed between the base station and the UE by a protocol.

It should be noted that the preset length is a preset length of time or a preset number of available wireless subframes. In a case where the preset length is the preset number of available wireless subframes, the preset length refers to the number of available wireless subframes after the UE starts or restarts the inactivity timer. In a case where the preset length is the present length of time, the preset length refers to the number of units of time or the number of wireless subframes.

The available wireless subframes mentioned above may include one of the followings in an optional implementation mode of this embodiment:

(1) the wireless subframe that is not constantly used for a specified channel and is not indicated as invalid, where the specified channel includes a Secondary Synchronization Signal (SSS), a Primary Synchronization Signal (PSS), a Physical Broadcast Channel (PBCH), a System Information Block 1 (SIB1), and a System Information (SI) message;

(2) a valid wireless subframe that is indicated by SIB1 and is not used for scheduling the SI message; and (3) a valid wireless subframe indicated by SIB1.

The above-mentioned valid wireless subframe refers to a subframe indicated by a downlink subframe bitmap in the SIB1. In a case where the downlink subframe bitmap in the SIB1 is default, the valid wireless subframe refers to subframes which are unoccupied by the SSS, the PSS, the PBCH or the SIB1.

In another optional implementation mode of this embodiment, the preset conditions involved in this embodiment includes at least one of:

(1) a moment when the UE successfully receives the PDCCH signaling for scheduling the channel A;

(2) a moment of a last subframe used for transmitting the PDCCH signaling for scheduling data of the channel A, or a moment of an Mth subframe or an Mth unit of time after transmitting the last subframe;

(3) a moment of a last subframe used for the PDCCH signaling for scheduling data of the channel A, or a moment of an Mth subframe or an Mth unit of time before transmitting the last subframe;

(4) a moment of a first subframe used for the PDCCH signaling for scheduling data of the channel A, or a moment of the Mth subframe or the Mth unit of time after transmitting the first subframe;

(5) a moment when the UE successfully receives the data of the channel A indicated by the PDCCH signaling;

(6) a moment of an Mth subframe or an Mth unit of time before a last repeatedly transmitted wireless subframe in one scheduled transmission of the channel A;

(7) a moment of an Mth subframe or an Mth unit of time after the last repeatedly transmitted wireless subframe in one scheduled transmission of the channel A; or (8) a moment of an Mth wireless subframe or an Mth unit of time after a first wireless subframe in one scheduled transmission of the channel A.

M is an integer greater than or equal to 0.

It should be noted that the M subframes include one of: a number of wireless subframes, or a number of available wireless subframes.

In an optional implementation mode of this embodiment, the method in this embodiment may further include steps 406, 408, 410 and 412.

In step S406, when the UE is receiving the PDCCH signaling for scheduling the channel A, and/or the UE is receiving the PDSCH for carrying the channel A, and/or after the UE has successfully received the PDCCH signaling for scheduling the channel A and when the UE receives the PDSCH indicated by the PDCCH signaling, if the running length of the inactivity timer exceeds the preset length, the UE continues to receive the PDCCH signaling or the PDSCH, or waits to receive the PDSCH.

In step S408, in a case where the running length of the inactivity timer exceeds the preset length, the UE does not perform any operation.

In step S410, in a process where the inactivity timer runs within the preset length, when the UE has not received the PDCCH signaling for scheduling the channel A and after the running length of the inactivity timer exceeds the preset length, the UE exits from a state of receiving the channel A in a current scheduling period of the channel A.

In step S412: during running of the inactivity timer, when the DCI for scheduling the channel A in the PDCCH signaling is received by the UE, the UE stops detecting the DCI for scheduling the channel A in the PDCCH signaling until the inactivity timer starts or restarts.

According to the above steps S406 to S412, when the UE is continuously receiving the PDCCH for scheduling SC-MTCH, and/or when the UE is receiving the PDSCH carrying the SC-MTCH, and/or after the UE has successfully received the PDCCH signaling for scheduling the SC-MTCH and when the UE is waiting for the PDSCH indicated by the PDCCH signaling, if the inactivity timer T expires, the UE does not perform any processing, that is, the UE keeps the current state unchanged and continues to receive the PDCCH or the PDSCH or wait to receive the PDSCH.

The above-mentioned continuous reception of the PDCCH or the PDSCH refers to multiple repeated transmission in which the UE receives the PDCCH or the PDSCH; that is, multiple repeated transmission in which the UE receives the PDCCH or the PDSCH according to an indication in the scheduling information or the preset number of transmission.

If the UE does not receive any PDCCH signaling for scheduling SC-MTCH during running of the inactivity timer, when the inactivity timer expires, the UE exits from the state of receiving the SC-MTCH, that is, exits from reception of the SC-MTCH in the scheduling period.

Alternatively, if the UE receives DCI in the PDCCH signaling for scheduling SC-MTCH during running of the inactivity timer, the UE stops detecting the DCI in the PDCCH signaling for scheduling the SC-MTCH until the inactivity timer is started or restarted.

It should be noted that the channel A involved in this embodiment may include: SC-MTCH in an NB-IoT system and/or an LTE eMTC system, and a dedicated data channel or other channels in the NB-IoT system and/or the LTE eMTC system. Other channels meet the following conditions: the control channel signaling for scheduling the channel A and/or the data channel for carrying the channel A are repeatedly transmitted for multiple times in respective wireless subframes in time domain.

In addition, the process of receiving data of the channel A in this embodiment refers to that the UE is receiving data of the channel A, or the UE is trying to receive data of the channel A.

Embodiment 2

Figure 5:
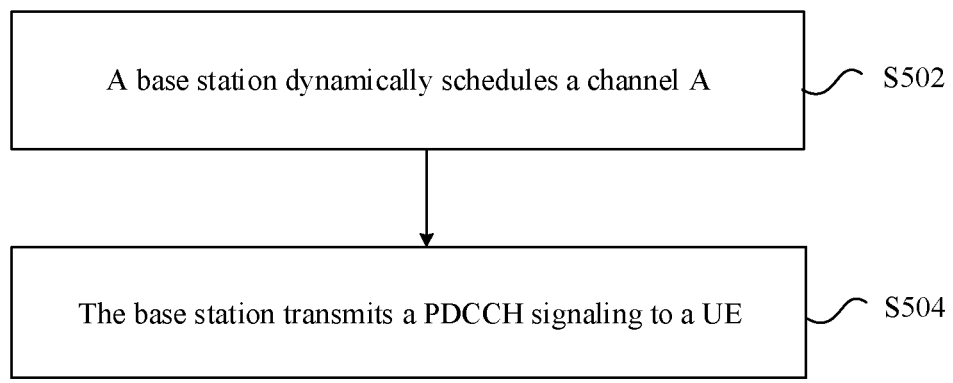
FIG. 5 is a flowchart 2 of a dynamic scheduling method according to an embodiment of the present disclosure.

FIG. 5 is a flowchart of a dynamic scheduling method according to an embodiment of the present disclosure. As shown in FIG. 5, the method includes steps S502 and S504 described below.

In step S502, a base station dynamically schedules a channel A.

In step S502, the base station transmits a PDCCH signaling to a UE.

Optionally, in the step S504 of the embodiment, the base station may transmit the PDCCH signaling to the UE in the following manner: the base station transmits the PDCCH signaling to the UE during running of the inactivity timer. The inactivity timer is triggered to start or restart by the UE at a preset moment.

From the description of the embodiments described above, it will be apparent to those skilled in the art that the methods in the embodiments described above may be implemented by software plus a necessary general-purpose hardware platform, or may of course be implemented by hardware. However, in many cases, the former is a preferred implementation mode. Based on this understanding, the present disclosure substantially, or the part contributing to the related art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device or the like) to execute the methods according to each embodiment of the present disclosure.

Embodiment 3

The embodiment further provides a block diagram of a dynamic scheduling apparatus. The apparatus is used for implementing the above-mentioned embodiments and preferred implementation modes. What has been described will not be repeated. As used below, the term "module" may be software, hardware or a combination thereof capable of implementing predetermined functions. The devices in the embodiments described below are preferably implemented by software, but implementation by hardware or by a combination of software and hardware is also possible and conceived.

Figure 6:
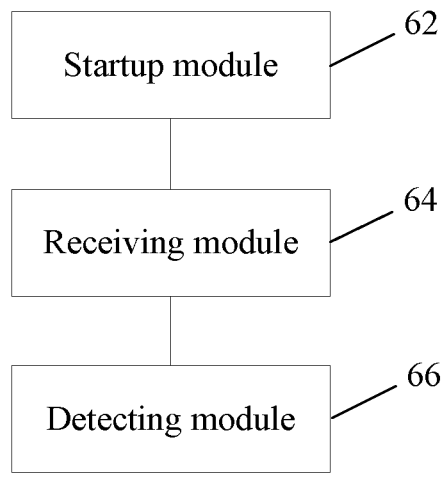
FIG. 6 is a block diagram 1 of a dynamic scheduling apparatus according to an embodiment of the present disclosure.

FIG. 6 is a block diagram 1 of a dynamic scheduling apparatus according to an embodiment of the present disclosure. The apparatus is applied to the UE. As shown in FIG. 6, the apparatus includes a startup module 62, a receiving module 64 and a detecting module 66. The startup module 62 is configured to, when receiving a channel A dynamically scheduled by a base station, trigger to start or restart an inactivity timer with a preset length at a preset moment. The receiving module 64 is coupled to the startup module 62 and is configured to receive a PDCCH signaling during running of the inactivity timer. The detecting module 66 is coupled to the receiving module 64 and is configured to detect DCI for scheduling the channel A.

In an optional implementation mode of this embodiment, the preset length involved in the embodiment is indicated by the base station to the dynamic scheduling apparatus through a SIB, a dedicated signaling, or a SC-MCCH message; or the preset length is agreed between the base station and the dynamic scheduling apparatus by a protocol.

It should be noted that the preset length is a preset length of time or a preset number of available wireless subframes. In a case where the preset length is the preset number of available wireless subframes, the preset length refers to the number of available wireless subframes after the UE starts or restarts the inactivity timer. In a case where the preset length is the present length of time, the preset length refers to the number of units of time or the number of wireless subframes.

The available wireless subframes involved in this embodiment include one of:
(1) a wireless subframe that is not constantly used for a specified channel and is not indicated as invalid, where the specified channel includes SSS, PSS, PBCH, SIB1 and SI message;
(2) a valid wireless subframe that is indicated by SIB1 and is not used for scheduling the SI message in the system information block; or
(3) a valid wireless subframe indicated by SIB1.

The wireless subframe refers to a subframe indicated by a downlink subframe bitmap in the SIB1. In a case where the downlink subframe bitmap in the SIB1 is default, the valid wireless subframe refers to subframes which are unoccupied by the SSS, the PSS, the PBCH or the SIB1.

In an optional embodiment of this embodiment, the preset conditions involved in this embodiment includes at least one of:
(1) a moment when the UE successfully receives the PDCCH signaling for scheduling the channel A;
(2) a moment of a last subframe used for transmitting the PDCCH signaling for scheduling data of the channel A, or a moment of an Mth subframe or an Mth unit of time after transmitting the last subframe;
(3) a moment of a last subframe used for the PDCCH signaling for scheduling data of the channel A, or a moment of an Mth subframe or an Mth unit of time before transmitting the last subframe;
(4) a moment of a first subframe used for the PDCCH signaling for scheduling data of the channel A, or a moment of the Mth subframe or the Mth unit of time after transmitting the first subframe;
(5) a moment when the UE successfully receives the data of the channel A indicated by the PDCCH signaling;
(6) a moment of an Mth subframe or an Mth unit of time before a last repeatedly transmitted wireless subframe in one scheduled transmission of the channel A;
(7) a moment of an Mth subframe or an Mth unit of time after the last repeatedly transmitted wireless subframe in one scheduled transmission of the channel A; or
(8) a moment of an Mth wireless subframe or an Mth unit of time after a first wireless subframe in one scheduled transmission of the channel A.

M is an integer greater than or equal to 0.

It should be noted that the M subframes include one of: a number of wireless subframes, or a number of available wireless subframes.

Optionally, the receiving module 54 is further configured to: when the UE is receiving the PDCCH signaling for scheduling the channel A, and/or the UE is receiving the PDSCH for carrying the channel A, and/or after the UE has successfully received the PDCCH signaling for scheduling the channel A and when the UE receives the PDSCH indicated by the PDCCH signaling, if the running length of the inactivity timer exceeds the preset length, continue to receive the PDCCH signaling or the PDSCH, or wait to receive the PDSCH.

Optionally, the apparatus of this embodiment may further include a prohibiting module. The prohibiting module is configured to perform no operation if the running length of the inactivity timer exceeds the preset length.

Optionally, the receiving module 54 is further configured to: in a process where the inactivity timer runs within the preset length, when the UE has not received the PDCCH signaling for scheduling the channel A and after the running length of the inactivity timer exceeds the preset length, receive the state of the channel A in a current scheduling period of the channel A.

Optionally, the detecting module 56 is further configured to: during running of the inactivity timer, when the DCI for scheduling the channel A in the PDCCH signaling is received by the UE, stop detecting the DCI for scheduling the channel A in the PDCCH signaling until the inactivity timer starts or restarts.

It should be noted that the channel A may include: SC-MTCH in an NB-IoT system and/or an LTE eMTC system, and a dedicated data channel or other channels in the NB-IoT system and/or the LTE eMTC system. Other channels meet the following conditions: the control channel signaling for scheduling the channel A and/or the data channel for carrying the channel A are repeatedly transmitted for multiple times in respective wireless subframes in time domain.

It should be noted that this embodiment is an apparatus embodiment corresponding to the method embodiment in the embodiment 1.

Embodiment 4

Figure 7:
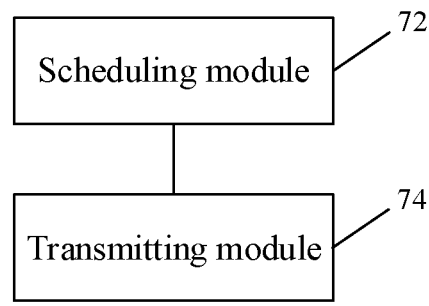
FIG. 7 is a block diagram 2 of a dynamic scheduling apparatus according to an embodiment of the present disclosure.

FIG. 7 is a block diagram 2 of a dynamic scheduling apparatus according to an embodiment of the present disclosure. The apparatus is applied to a base station. As shown in FIG. 7, the apparatus includes a scheduling module 72 and a transmitting module 74. The scheduling module 72 is configured to dynamically schedule a channel A. The transmitting module 74 is coupled to the scheduling module 72 and is configured to transmit a PDCCH signaling to a UE.

Optionally, the transmitting module 74 is further configured to transmit the PDCCH signaling to the UE during running the inactivity timer. The inactivity timer is triggered to start or restart by the UE at a preset moment.

It should be noted that this embodiment is an apparatus embodiment corresponding to the method embodiment in the embodiment 2.

It is to be noted that the various modules described above may be implemented by software or hardware. Implementation by hardware may, but may not necessarily, be performed in the following manner: the various modules described above are located in a same processor, or the various modules described above are located in their respective processors in any combination form.

The above embodiments 1 to 4 will be described in detail below with reference to the specific embodiments 5 and 6 of the embodiments of the present disclosure.

Embodiment 5

Figure 8:
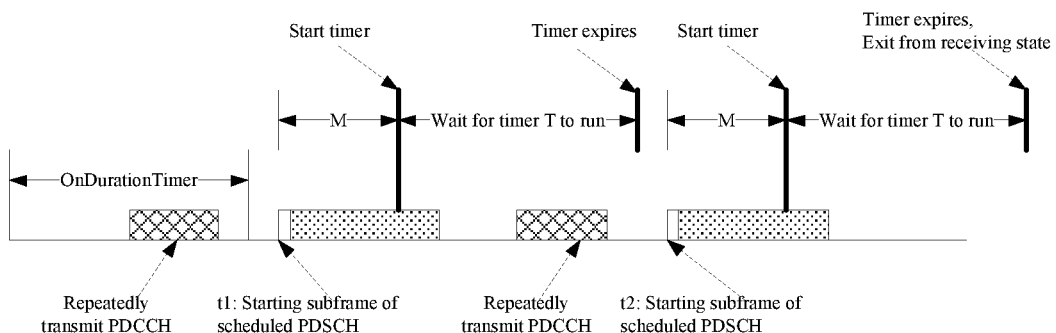
FIG. 8 is a schematic diagram 1 of dynamic scheduling according to an embodiment of the present disclosure.

FIG. 8 is a schematic diagram 1 of dynamic scheduling according to an embodiment of the present disclosure. As shown in FIG. 8, the base station configures a scheduling period of the SC-MTCH and a SC-MTCH transmission window which is indicated by onDurationTimer. It is not within the scope of the present disclosure to specifically configure the offset length of the SC-MTCH transmission window.

The base station configures a scrambling code G-RNTI dedicated to the SC-MTCH.

The UE continuously receives the PDCCH in the SC-MTCH transmission window configured above, and detects the DCI scrambled by the G-RNTI of the SC-MTCH that needs to be received.

In this embodiment, the UE starts or restarts an inactivity timer T after the Mth available subframe, or the Mth subframe, or the Mth valid subframe or the M units of time after the first wireless subframe of the SC-MTCH data transmission indicated by the PDCCH signaling.

In FIG. 8, the UE first detects a scheduling of the SC-MTCH indicated by the PDCCH signaling; then the UE acquires the starting subframe position of the scheduled PDSCH through content indicated by the PDCCH signaling (i.e., the scheduling delay indicated by DCI in the PDCCH signaling) or through agreement. As shown in FIG. 8, the starting subframe position is t1.

The UE starts or restarts the inactivity timer T after the Mth subframe or M units of time after the moment t1 (subframe).

During running of the inactivity timer, the UE continuously detects the PDCCH, and the PDCCH signaling scrambled by G-RNTI is detected. The PDCCH signaling indicates that the scheduling of the PDSCH starts from the subframe at moment t2, and the UE starts or restarts the inactivity timer T after the Mth subframe at moment t3 which comes after the Mth subframe after the moment t2 or after M units of time after the moment t2.

The dynamic scheduling continues in a similar way, until the UE fails to detect new PDCCH signaling scrambled by the G-RNTI for scheduling the SC-MTCH within the running length of the inactivity timer T.

If the inactivity timer T expires in a case where the UE is continuously receiving the PDCCH for scheduling the SC-MTCH or the PDSCH carrying the SC-MTCH, or in a case where the UE has received the PDCCH signaling for scheduling the SC-MTCH and is waiting for the PDSCH scheduled by a receiver, the UE does not perform any processing, that is, continues to maintain the current state, and continues to receive the PDCCH or the PDSCH. In FIG. 8, when the first inactivity timer expires for a first time, the UE has successfully received PDCCH signaling and is waiting to receive data of the PDSCH which is scheduled by the PDCCH signaling. Therefore, the expiration of the inactivity timer does not have any impact on the UE, and the UE does not perform any processing and continues to wait to receive the PDSCH.

When the inactivity timer expires for a second time, the UE has not detected the PDCCH signaling for scheduling the SC-MTCH during running of the inactivity timer. At this moment, the UE exits from the state of receiving the SC-MTCH.

Embodiment 6

Figure 9:
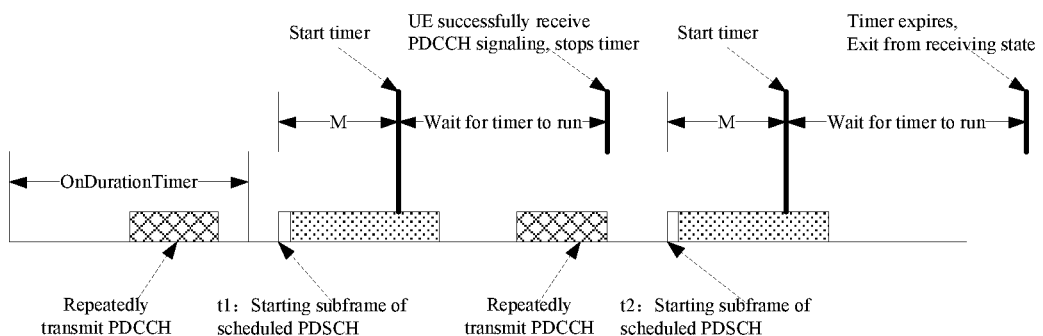
FIG. 9 is a schematic diagram 2 of dynamic scheduling according to an embodiment of the present disclosure.

FIG. 9 is a schematic diagram 2 of dynamic scheduling according to an embodiment of the present disclosure. As shown in FIG. 9, the difference between this embodiment and Embodiment 5 is described below.

During running of the inactivity timer, the UE stops the operation of the inactivity timer if DCI scrambled by the G-RNTI in the PDCCH signaling for scheduling the SC-MTCH that needs to be received is successfully received.

That is, after receiving the PDCCH signaling for scheduling the SC-MTCH, the UE does not need to continue to receive the PDCCH to detect the DCI scrambled by the G-RNTI corresponding to the SC-MTCH, and until the inactivity timer is restarted could the UE continue to receive the PDCCH.

After the UE successfully receives SC-MTCH data scheduled by PDCCH by applying the method provided by the present disclosure, the UE only needs to continuously monitor the PDCCH within a necessary time range to receive subsequent possible SC-MTCH scheduling. In this case, the waste of the battery power caused by continuously detecting the PDCCH for a long time can be avoided.

It should be noted that the foregoing embodiment 5 and embodiment 6 only take the dynamic scheduling and reception of the SC-MTCH channel in the NB-IoT or eMTC system as an example. In all other channel scheduling satisfying the following conditions: the control channel signaling for dynamically scheduling the channel and one transmission of the data channel for carrying data of the channel data need to be repeated on multiple wireless subframes in the time domain, (that is, the control channel signaling and the data channel each is repeated several times to form a complete scheduling), the repetition of the control channel and the data channel are staggered in the time domain.

An embodiment of the present disclosure further provides a storage medium. Optionally, in the embodiment, the storage medium may be configured to store program codes for executing the steps S1 and S2 described below:

In step S1, in a process in which a UE receives data of a channel A, the UE triggers to start or restart an inactivity timer with a preset length at a preset moment;

In step S2, during running of the inactivity timer, the UE receives a PDCCH signaling sent by a base station, and detects DCI for scheduling the channel A.

Optionally, in the embodiment, the storage medium described above may include, but is not limited to, a USB flash disk, a read-only memory (ROM), a random access memory (RAM), a mobile hard disk, a magnetic disk, an optical disk or another medium capable of storing program codes.

Optionally, for specific examples in the embodiment, reference may be made to the examples described in the above-mentioned embodiments and optional implementation modes, and repetition will not be made herein.

Apparently, it should be understood by those skilled in the art that each of the above-mentioned modules or steps of the present disclosure may be implemented by a general-purpose computing device, the modules or steps may be concentrated on a single computing device or distributed on a network composed of multiple computing devices, and alternatively, the modules or steps may be implemented by program codes executable by the computing devices, so that the modules or steps may be stored in a storage device and executed by the computing devices. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure. For those skilled in the art, the present disclosure may have various modifications and variations. Any modifications, equivalent substitutions, improvements and the like made within the spirit and principle of the present disclosure should fall within the scope of the present disclosure.

What is claimed is:

1. A dynamic scheduling method, comprising:
   in a process in which a user equipment (UE) receives data of a channel A, triggering, by the UE, to start or restart an inactivity timer with a preset length of at a preset moment; and
   during running of the inactivity timer, receiving, by the UE, a Physical Downlink Control Channel (PDCCH) signaling sent by a base station, and detecting Downlink Control Information (DCI) for scheduling the channel A in the PDCCH signaling,
   wherein the channel A comprises one of:
      a Single-Cell point to Multipoint data Channel (SC-MTCH) in one of a Narrowband Internet of Things (NB-IoT) system or an Long-Term Evolution (LTE) enhanced machine-type communication (eMTC) system;
      a dedicated data channel in one of the NB-IoT system or the LTE eMTC system; or
      other channels in one of the NB-IoT system or the LIT eMTC system;
   wherein the other channels satisfy one of the following conditions:
      a control channel signaling for scheduling the channel A is repeatedly transmitted for a plurality of times in respective wireless subframes in time domain, and
      a data channel for carrying the channel A is repeatedly transmitted for a plurality of times in respective wireless subframes in time domain.

2. The method of claim 1, wherein the preset length is indicated by the base station to the UE through one of: a System Information Block (SIB), a dedicated signaling, or a Single Cell Multicast Control Channel (SC-MCCH) message;
   the preset length is a preset length of time, or a preset number of available wireless subframes;
   wherein in a case where the preset length is the preset number of the available wireless subframes, the preset length refers to a number of available wireless subframes after the UE starts or restarts the inactivity timer; and in a case where the preset length is the preset length of time, the preset length refers to a number of units of time or a number of wireless subframes.

3. The method of claim 2, wherein the available wireless subframes comprise one of:
   a wireless subframe that is not constantly used for a specified channel and is not indicated as invalid, wherein the specified channel includes a Secondary Synchronization Signal (SSS), a Primary Synchronization Signal (PSS), a Physical Broadcast Channel (PBCH), a System Information Block 1 (SIB1), and a System Information (SI) message;
   a valid wireless subframe that is indicated by the SIB1 and is not used for scheduling the SI message; or
   a valid wireless subframe indicated by the SIB 1;
   wherein the valid wireless subframe refers to one of:
   a subframe indicated by a downlink subframe bitmap in the SIB1; or
   all subframes unoccupied by the SSS, the PSS, the PBCH or the SIB1 in a case where the downlink subframe bitmap in the SIB1 is default.

4. The method of claim 1, wherein the preset moment comprises at least one of:
   a moment when the UE successfully receives the PDCCH signaling for scheduling the channel A;
   a moment of a last subframe used for transmitting the PDCCH signaling for scheduling data of the channel A, or a moment of an Mth subframe or an Mth unit of time after transmitting the last subframe;
   a moment of the last subframe used for transmitting the PDCCH signaling for scheduling the data of the channel A, or a moment of an Mth subframe or an Mth unit of time before transmitting the last subframe;
   a moment of transmitting a first subframe of the PDCCH signaling for scheduling the data of the channel A, or a moment of the Mth subframe or the Mth unit of time after transmitting the first subframe;
   a moment when the UE successfully receives the data of the channel A indicated by the PDCCH signaling;
   a moment of an Mth subframe or an Mth unit of time before a last repeatedly transmitted wireless subframe in one scheduled transmission of the channel A;

a moment of an Mth subframe or an Mth unit of time after the last repeatedly transmitted wireless subframe in one scheduled transmission of the channel A; or a moment of an Mth wireless subframe or an Mth unit of time after a first wireless subframe in one scheduled transmission of the channel A;

wherein M is an integer greater than or equal to 0;

wherein the M subframes comprise one of: a number of wireless subframes, or a number of available wireless subframes.

5. The method of claim 1, further comprising: when the running length of the inactivity timer exceeds the preset length, in a process where the UE is receiving the PDCCH signaling for scheduling the channel A, continuing, by the UE, to receive the PDCCH signaling;

in a process where the UE is receiving a PDSCH carrying the channel A, continuing, by the UE, to receive data of the PDSCH; and after the UE has successfully received the PDCCH signaling for scheduling the channel A and in a process of waiting to receive the PDSCH indicated by the PDCCH signaling, continuing, by the UE, to wait to receive the PDSCH.

6. The method of claim 1, further comprising:

in a process where the inactivity timer runs within the preset length, in response to that the UE has not received the PDCCH signaling for scheduling the channel A and the running length of the inactivity timer exceeds the preset length, exiting, by the UE, from a state of receiving the channel A in a current scheduling period of the channel A.

7. The method of claim 1, further comprising:

during running of the inactivity timer, in a case where the UE receives the DCI for scheduling the channel A in the PDCCH signaling, the UE stops detecting the DCI for scheduling the channel A in the PDCCH signaling until the inactivity timer starts or restarts.

8. A non-transitory computer-readable storage medium, comprising stored programs which, when executed, perform the method of claim 1.

9. A dynamic scheduling method, comprising:

scheduling dynamically, by a base station, a channel A for a user equipment (UE);

transmitting, by the base station, a Physical Downlink Control Channel (PDCCH) signaling to the UE, wherein the channel A comprises one of:

a Single-Cell point to Multipoint data Channel (SC-MTCH) in one of a Narrowband Internet of Things (NB-IoT) system or an Long-Term Evolution (LTE) enhanced machine-type communication (eMTC) system;

a dedicated data channel in one of the NB-IoT system or the LTE eMTC system; or other channels in one of the NB-IoT system or the LTE eMTC system;

wherein the other channels satisfy one of the following conditions:

a control channel signaling for scheduling the channel A is repeatedly transmitted for a plurality of times in respective wireless subframes in time domain, and a data channel for carrying the channel A is repeatedly transmitted for a plurality of times in respective wireless subframes in time domain.

10. The method of claim 9, wherein transmitting, by the base station, the PDCCH signaling to the UE comprises:

transmitting by the base station, the PDCCH signaling to the UE during running of an inactivity timer, wherein the inactivity timer is triggered to start or restart by the UE at a preset moment.

11. A storage medium, comprising stored programs which, when executed, perform the method of claim 9.

12. A dynamic scheduling apparatus, applied to a user equipment (UE), and comprising:

a processor; and a memory for storing instructions executable by the processor, wherein the processor is configured to:

trigger to start or restart an inactivity timer with a preset length at a preset moment in a process of receiving data of a channel A;

receive a Physical Downlink Control Channel (PDCCH) signaling during running of the inactivity timer; and detect downlink control information (DCI) for scheduling the channel A in the PDCCH signaling, wherein the channel A comprises one of:

a Single-Cell point to Multipoint data Channel (SC-MTCH) in one of a Narrowband Internet of Things (NB-IoT) system or an Long-Term Evolution (LTE) enhanced machine-type communication (eMTC) system;

a dedicated data channel in one of the NB-IoT system or the LTE eMTC system; or other channels in one of the NB-IoT system or the LTE eMTC system, wherein the other channels satisfy one of the following conditions:

a control channel signaling for scheduling the channel A is repeatedly transmitted for a plurality of times in respective wireless subframes in time domain, and a data channel for carrying the channel A is repeatedly transmitted for a plurality of times in respective wireless subframes in time domain.

13. The apparatus of claim 12, wherein the preset length is a indicated by a base station to the dynamic scheduling apparatus through one of: a System Information Block (SIB), a dedicated signaling, or a Single Cell Multicast Control Channel (SC-MCCH) message; or the preset length is agreed by the base station and the dynamic scheduling apparatus through a protocol;

the preset length is a preset length of time, or a preset number of available wireless subframes;

wherein in a case where the preset length is the preset number of the available wireless subframes, the preset length refers to a number of available wireless subframes after the UE starts or restarts the inactivity timer; and in a case where the preset length is the preset length of time, the preset length refers to a number of units of time or a number of wireless subframes.

14. The apparatus of claim 13, wherein the available wireless subframes comprise one of:

a wireless subframe that is not constantly used for a specified channel and is not indicated as invalid, wherein the specified channel includes a Secondary Synchronization Signal (SSS), a Primary Synchronization Signal (PSS), a Physical Broadcast Channel (PBCH), a System Information Block 1 (SIB1), and a System Information (SI) message;

a valid wireless subframe that is indicated by the SIB1 and is not used for the scheduling the SI message;

a valid wireless subframe indicated by SIB1;

wherein the valid wireless subframe refers to one of:

a subframe indicated by a downlink subframe bitmap in the SIB1; or all subframes unoccupied by the SSS, the PSS, the PBCH or the SIB1 in a case where the downlink subframe bitmap in the SIB1 is default.

15. The apparatus of claim 12, wherein the preset moment comprises at least one of:

a moment when the UE successfully receives the PDCCH signaling for scheduling the channel A;

a moment of a last subframe used for transmitting the PDCCH signaling for scheduling data of the channel A, or a moment of an Mth subframe or an Mth unit of time after transmitting the last subframe;

a moment of the last subframe used for transmitting the PDCCH signaling for scheduling data of the channel A, or a moment of an Mth subframe or an Mth unit of time before transmitting the last subframe;

a moment of transmitting a first subframe of the PDCCH signaling for scheduling the data of the channel A, or a moment of the Mth subframe or the Mth unit of time after transmitting the first subframe;

a moment when the UE successfully receives the data of the channel A indicated by the PDCCH signaling;

a moment of an Mth subframe or an Mth unit of time before a last repeatedly transmitted wireless subframe in one scheduled transmission of the channel A;

a moment of an Mth subframe or an Mth unit of time after the last repeatedly transmitted wireless subframe in one scheduled transmission of the channel A; or a moment of an Mth wireless subframe or an Mth unit of time after a first wireless subframe in one scheduled transmission of the channel A;

wherein M is an integer greater than or equal to 0.

16. A dynamic scheduling apparatus, applied to a base station, and comprising:

a processor; and a memory for storing instructions executable by the processor, wherein the processor is configured to implement the method of claim 9.

17. The apparatus of claim 16, wherein the processor is further configured to transmit the PDCCH signaling to the UE during running of the inactivity timer, wherein the inactivity timer is triggered to start or restart by the UE at a preset moment.

* * * * *

UNITED STATES PATENT AND TRADEMARK OFFICE
CERTIFICATE OF CORRECTION

PATENT NO. : 10,917,908 B2  
APPLICATION NO. : 16/272873  
DATED : February 9, 2021  
INVENTOR(S) : Jianxun Ai Page 1 of 1

It is certified that error appears in the above-identified patent and that said Letters Patent is hereby corrected as shown below:

In the Specification

In Column 2, Line 21, delete "InactivityTimer" and insert --inactivity timer--.

In the Claims

In Column 12, Line 3, Claim 1, delete "LIT" and insert --LTE--.

In Column 12, Line 40, Claim 3, delete "SIB 1;" and insert --SIB1;--.

In Column 14, Line 30, Claim 12, delete "system," and insert --system;--.

Signed and Sealed this
First Day of June, 2021

Drew Hirshfeld
*Performing the Functions and Duties of the
Under Secretary of Commerce for Intellectual Property and
Director of the United States Patent and Trademark Office*